United States Patent

Groenhof

[15] 3,639,239
[45] Feb. 1, 1972

[54] BIS(TRIORGANOSILYL)PHOSPHATE COMPOSITIONS

[72] Inventor: Eugene D. Groenhof, Midland, Mich.
[73] Assignee: Dow Corning Corporation, Midland, Mich.
[22] Filed: Sept. 17, 1969
[21] Appl. No.: 858,886

[52] U.S. Cl. .................................... 252/49.9, 260/448.2 N
[51] Int. Cl. .................................... C10m 1/50, C10m 1/46
[58] Field of Search ................................. 252/49.9

[56] References Cited

UNITED STATES PATENTS

| 2,843,615 | 7/1958 | Linville | 252/49.9 X |
| 2,963,503 | 12/1960 | Marsden | 252/49.9 X |
| 3,441,585 | 4/1969 | Brown | 252/49.9 X |

Primary Examiner—Daniel E. Wyman
Assistant Examiner—W. Cannon
Attorney—Robert F. Fleming, Jr., Laurence R. Hobey, Harry D. Dingman and Norman E. Lewis

[57] ABSTRACT

Disiloxy derivatives of fluoroalkyl acid phosphates of the general formula

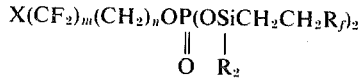

are disclosed as corrosion inhibitors for fluorosilicone lubricants.

2 Claims, No Drawings

BIS(TRIORGANOSILYL)PHOSPHATE COMPOSITIONS

This invention relates to novel disiloxy derivatives of fluoroalkyl acid phosphates. In one aspect, the invention relates to corrosion resistant lubricants.

The invention provides compounds of the formula

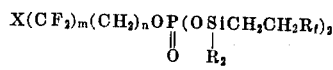

in which
- $R_f$ is a perfluoroalkyl radical of no more than 10 carbon atoms;
- R is a lower alkyl radical of no more than six carbon atoms or a phenyl radical;
- X is a hydrogen or fluorine atom;
- $n$ is an integer having a value of from 1 to 16; and
- $m$ is an integer having a value of from 2 to 24.

As described above, $R_f$ can be any perfluoroalkyl radical, such as $-CF_3$, $-C_2F_2$ and so on thru $-C_{10}F_{21}$. The radicals can be straight or branched chain. The same or different $R_f$ radicals can be bonded in the same silicon atom.

Thus, included within the scope of the invention are compounds of the formulas

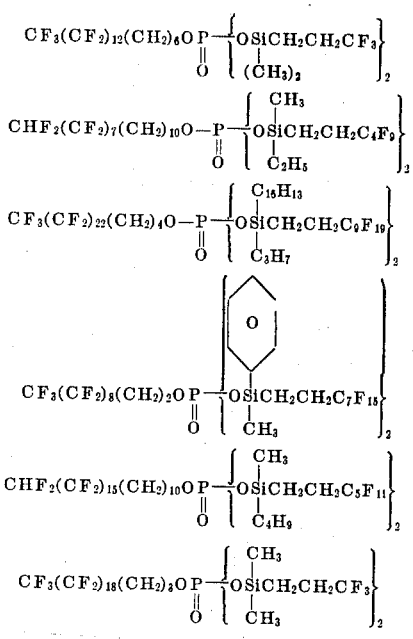

and

The disiloxy derivatives of the fluoroalkyl acid phosphates are prepared by reacting fluoroalkylphosphoric compounds of the formula $X(CF_2)_m(CH_2)_nOPO(OH)_2$ with silazanes of the formula $\{(R_fCH_2CH_2)(R)_2Si\}_2NH$ in a suitable solvent such as ether. The reaction is mildly exothermic. The silazane precurser is prepared by the reaction of ammonia with silanes of the formula $(R_fCH_2CH_2)R_2SiCl$. The fluoroalkylphosphoric compounds are well known and are commercially available.

The compounds of the invention are useful as corrosion inhibiting additives to organopolysiloxane fluids. Dimethylpolysiloxanes, phenylmethylpolysiloxanes and trifluoropropylmethylsiloxanes are representative of such siloxanes. Generally, from 0.005 to 5 weight percent concentrations of the disiloxy compounds in the fluids is sufficient to obtain the desired inhibition of corrosion.

The following examples are illustrative and not limiting of the invention, which is properly delineated in the claims.

EXAMPLE 1

A mixture of fluoroalkyl phosphates (43.5 grams) of the formulas $H(CF_2)_4CH_2OPO(OH)_2$ and $H(CF_2)_6CH_2OPO(OH)_2$ was dissolved in 50 milliliters of diethylether. A slight excess of $\{CF_3CH_2CH_2(CH_3)_2Si\}_2NH$ was added to the ether solution. Ammonia was generated immediately. The reaction mixture was stirred for 1 hour at room temperature and then heated at ether reflux temperature for 1 hour. The reaction mixture was vacuum distilled to obtain a 75 percent yield of $H(CF_2)_{4-6}CH_2OP(O)\{OSi(CH_3)_2CH_2CH_2CF_3\}_2$ having a boiling point range for the different species of 125°–151° C./0.1 mm. Hg.

EXAMPLE 2

To demonstrate its utility as a rust inhibitor in lubricants, various amounts of the product of example 1 were added to 3,3,3-trifluoropropylmethylpolysiloxane which has a viscosity of 300 cs. at 25° C. The inhibitor-containing fluids were tested in accordance with ASTM D-665A. Test results are listed below:

| Concentration of $H(CF_2)_{4-6}CH_2OP(O)$ $OSi(CH_3)_2CH_2CH_2CF_3\}_2$ in fluid lubricant (wt. %) | Soluble | Results |
|---|---|---|
| 0.01 | yes | pass |
| 0.05 | yes | pass |
| 0.10 | yes | pass |
| 0.20 | yes | pass |
| 1.0 | yes | pass |

The fluorosilicone lubricant was tested without the addition of compounds within the scope of the invention and failed the test.

That which is claimed is:

1. A composition comprising a fluid organopolysiloxane and from 0.005 to 5 weight percent, based on the weight of organopolysiloxane, of a composition of the formula

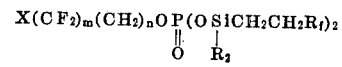

$R_f$ is a perfluoroalkyl radical of no more than 10 carbon atoms;
R is a lower alkyl radical of no more than six carbon atoms or a phenyl radical;
X is a hydrogen or a fluorine atom;
$n$ is an integer having a value of from 1 to 16; and
$m$ is an integer having a value of from 2 to 24.

2. The composition of claim 1 wherein the organopolysiloxane is 3,3,3-trifluoropropylmethylpolysiloxane.

* * * * *